United States Patent [19]

Röck et al.

[11] 4,445,726
[45] May 1, 1984

[54] PULL-OUT GUIDE ASSEMBLY FOR DRAWERS

[75] Inventors: Erich Röck, Höchst; Bernhard Mages, Dornbirn, both of Austria

[73] Assignee: Julius Blum Gesellschaft m.b.H., Höchst, Austria

[21] Appl. No.: 399,231

[22] Filed: Jul. 19, 1982

Related U.S. Application Data

[62] Division of Ser. No. 169,195, Jul. 15, 1980, Pat. No. 4,351,575.

[30] Foreign Application Priority Data

Jul. 19, 1979 [AT] Austria ................................. 4980/79
May 6, 1980 [AT] Austria ................................. 2416/80

[51] Int. Cl.³ ............................................. F16C 29/04
[52] U.S. Cl. .................................................. 308/3.8
[58] Field of Search ................. 308/3.8, 3.6, 6 R, 3 R; 312/341 R

[56] References Cited

U.S. PATENT DOCUMENTS 2,859,070 11/1958 Gomersall ............................ 308/3.8
3,857,618 12/1974 Hagen et al. ......................... 308/3.8
4,324,439 4/1982 Hagen et al. ......................... 308/3.8

Primary Examiner—Lenard A. Footland
Attorney, Agent, or Firm—Wenderoth, Lind & Ponack

[57] ABSTRACT

A pull-out guide assembly for drawers is provided by means of which a drawer can be pulled out of a body of a piece of furniture over its entire depth, while still being anchored in the supporting rails on the side of the body. The assembly includes supporting rails on the sides of the body, pull-out rails fastened to the drawer and center rails arranged between the supporting and pull-out rails. Carriages are arranged between the rails, rollers transferring the load from one rail to the other being mounted in the carriages. Locking- and control members are provided to control the course of movement of the individual members of the pull-out guide or to hold the members of the pull-out guide together, when the drawer has been entirely taken out of the body of the piece, thus facilitating the reinsertion of the drawer into the body of the piece of furniture.

5 Claims, 17 Drawing Figures

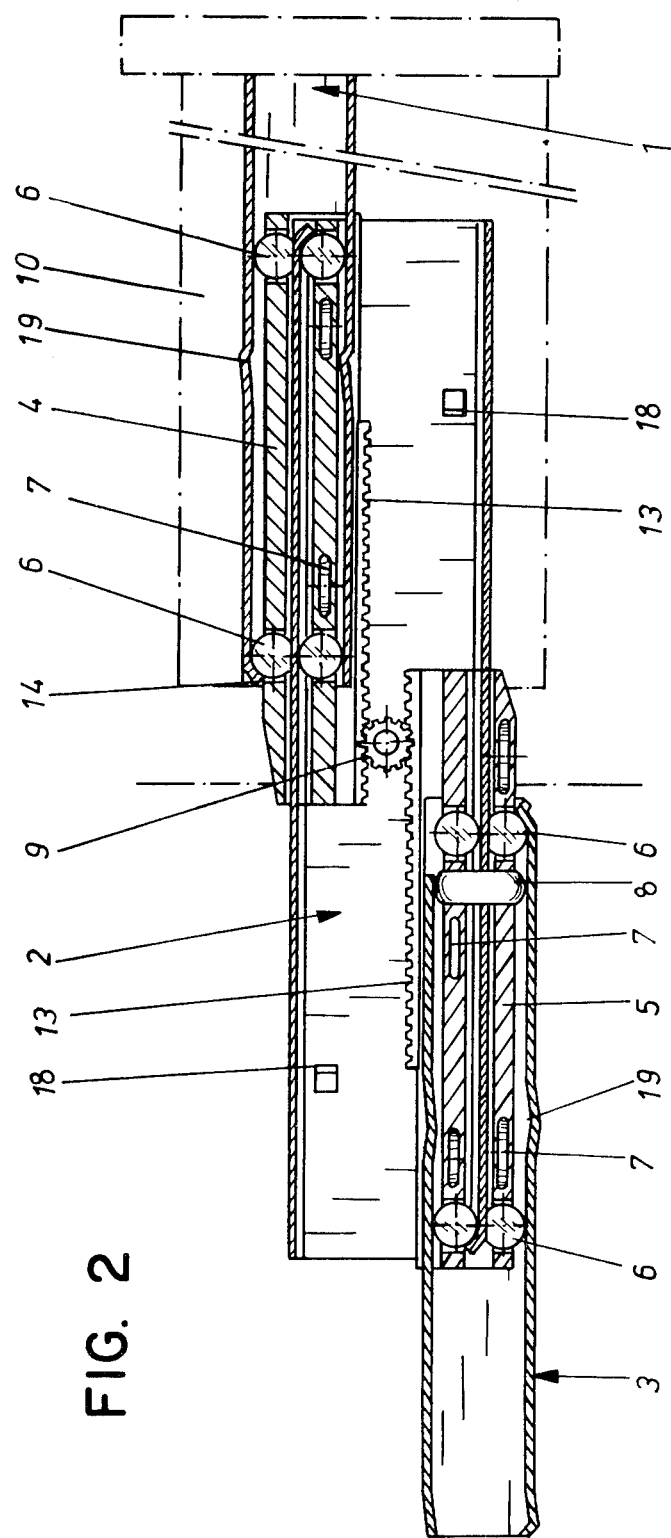

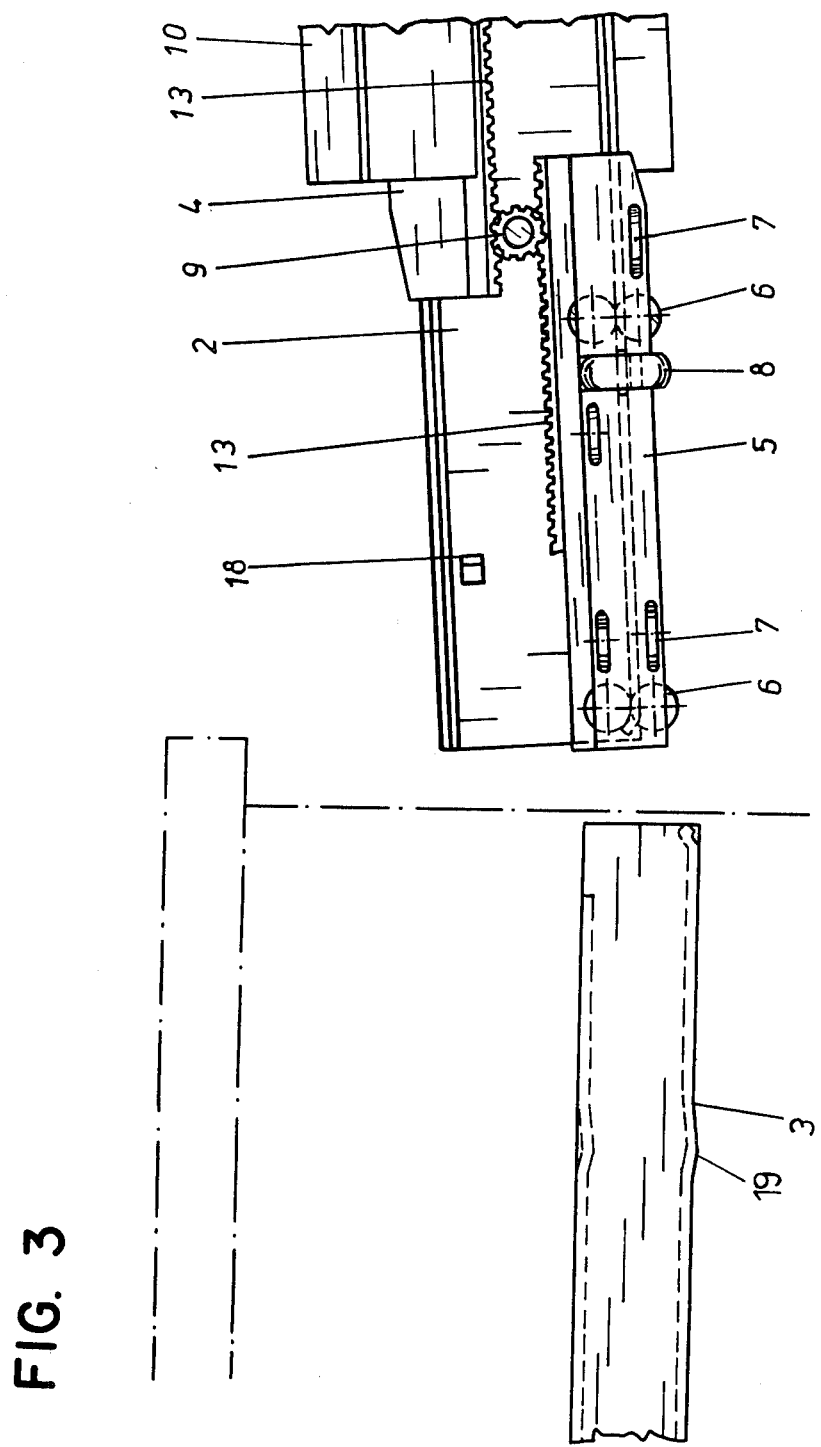

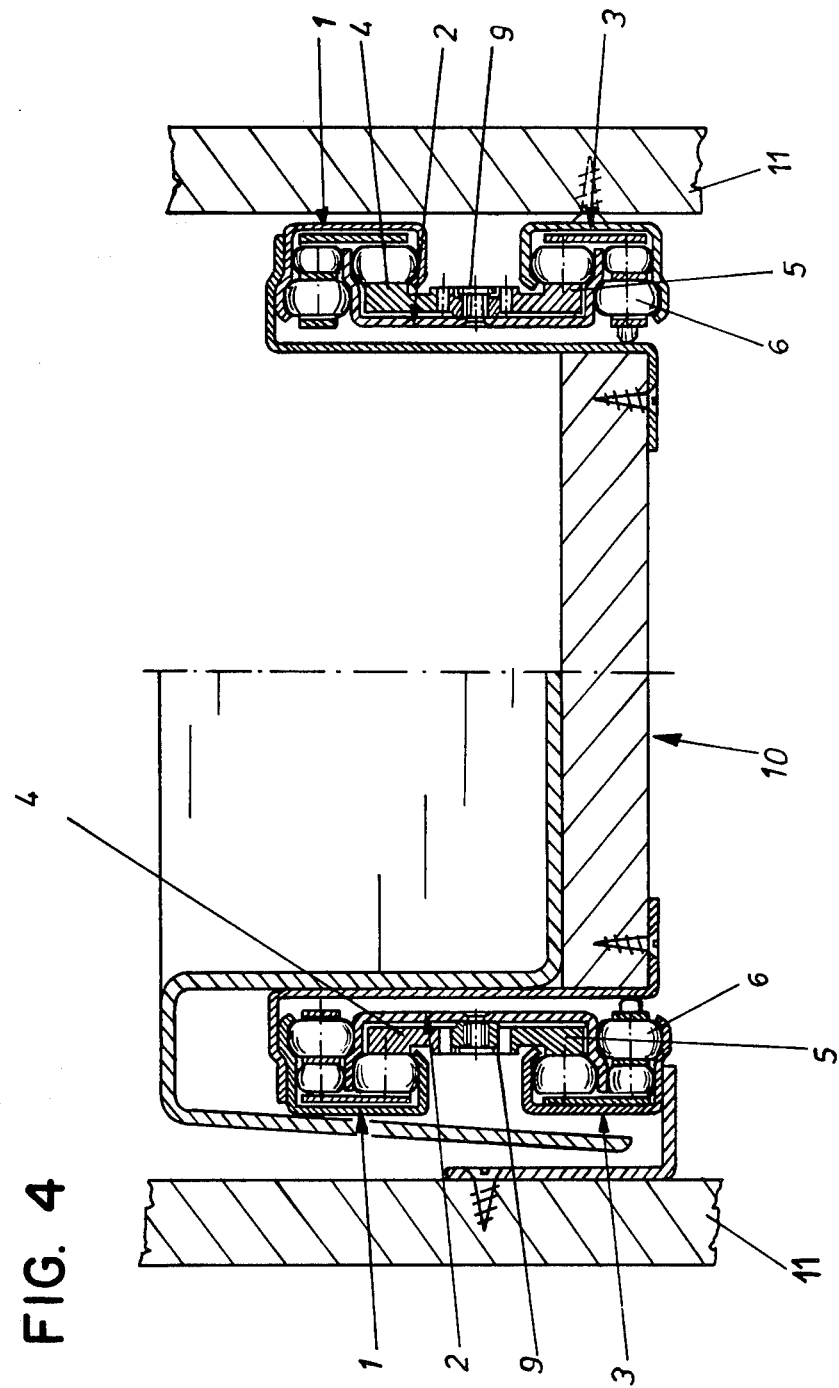

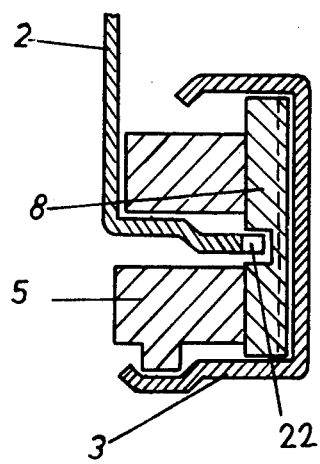
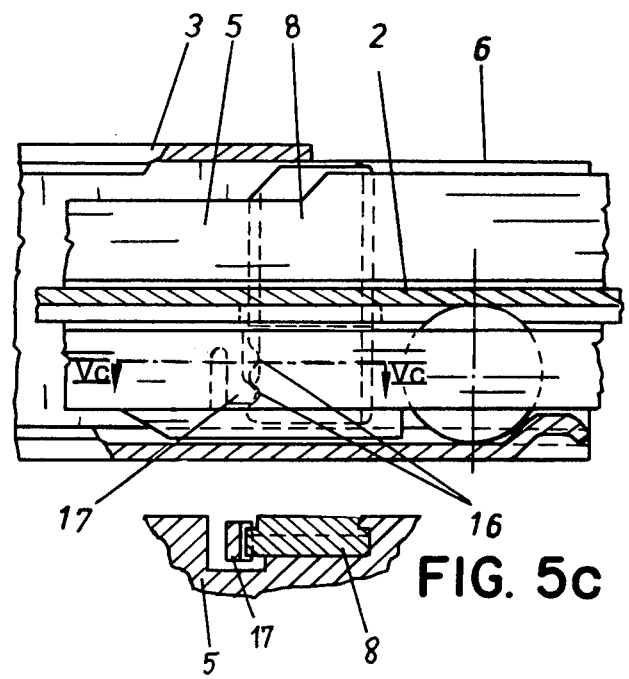
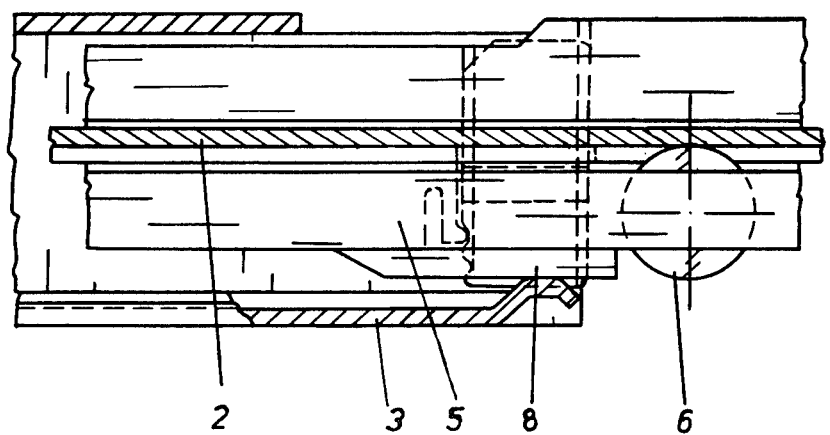

PULL-OUT GUIDE ASSEMBLY FOR DRAWERS

This is a division of application Ser. No. 169,195, filed July 15, 1980 now U.S. Pat. No. 4,351,575.

BACKGROUND OF THE INVENTION

1. Field of the Invention

The present invention relates to a pull-out guide assembly for drawers or the like comprising a supporting rail on either side of a body of a piece of furniture, a pull-out rail on either side of the drawer and a center rail running differentially between each pair of supporting and pull-out rails, the load of the drawer being transferred by means of rollers or the like.

2. Description of the Prior Art

Pull-out guides of the above-mentioned type frequently are used in modern furniture construction. With their help the drawers can be pulled out more easily and without obstruction even if the drawer carries heavy loads. With so-called differential pull-out guides, which comprise three rails on each side, i.e. a pull-out rail on the side of the drawer, a supporting rail on the side of the body and a center rail differentially running inbetween, it is possible to pull the drawer fully out of the body of the piece of furniture in order to have free access to the interior of the drawer, the drawer being still retained in the body of the piece of furniture.

An increasing number of so-called carriages lately have been used in pull-out guide assemblies.

These carriages have the advantage that they can be manufactured at low cost (they can be made entirely of injection-moulded plastic material) and guarantee a smooth running of the pull-out assembly.

Such guides have the disadvantage that the carriages are not precisely aligned with respect to one another, i.e. there is no uniform course of movement between the rail and the carriage, when the drawer is pulled out or pushed in. The carriage may have already reached its final stop and thus be retained before the outward or inward movement of the assembly is finished. Hence, the rollers or balls can no longer move freely between the open rails.

SUMMARY OF THE INVENTION

It is, therefore, the object of the present invention to provide a pull-out guide of the afore-mentioned type in which the movements of the two carriages are controlled with respect to each other as well as with respect to the center rail so that an optimum uniform movement is obtained, when the drawer is pulled out and pushed in. The carriages are prevented from sliding on the individual rails, or at least from sliding over an appreciable distance.

The carriages and/or the rails particularly should be retained in exact positions, when the drawer, which has been taken out, is inserted again so that the carriages are in the positions required for the subsequent course of movement of the rails.

According to the present invention this is achieved by mounting rollers on each side of the drawer in two carriages, one of the carriages being mounted in the supporting rail and the second of the carriages being mounted in the pull-out rail, and by providing safeguard control means between the two carriages and/or one carriage and the supporting- or pull-out rail.

It is preferably provided that a pinion is mounted in the center of the center rail, such pinion mating with racks of both carriages, thus forming safeguard control means.

DE-OS No. 23 15 316 (Merz) and DE-OS No. 20 18 671 (Stanley) show the employment of pinions and toothed racks as control means in pull-out guides. These pull-out guides do, however, not belong to the kind described in the present invention as they include and the carriages, are in position which guarantee the position of the carriages does not arise.

It is a further object of the present invention to provide a pull-out assembly whose individual members do not fall apart, when the drawer has been pulled out fully of the body of the piece of furniture. The individual members are fixed to one another in such a manner that the drawer can again be pushed into the body without any further measures, whereby the members, i.e. the supporting rail, the pull-out rail, the center rail and the carriages are in the position which guarantees an immediate functioning of the pull-out guide assembly.

According to the present invention this is achieved by providing one of the carriages with locking means retaining such carriage immovably on the center rail, when the drawer is in the pulled-out position.

It preferably is provided that the locking means are arranged on the carriage mounted in the supporting rail on the side of the body of the piece of furniture.

Particularly safe locking means are obtained by providing them in the form of a slide which is preferably acted upon by a spring and which engages a hole in the center rail when the drawer is in the pulled-out position.

A further embodiment of the invention provides that the horizontal flanges of supporting rail and of the pull-out rail each are provided with a recess arranged approximately in the center of such flange.

By means of this arrangement the drawer, which is pushed into the body of the piece of furniture, engages the recesses. One roller of each carriage is pressed into a respective recess by the load of the drawer.

A minimum resistance has to be overcome, when the drawer is pulled out. Such resistance prevents the drawer from rolling forwards unintentionally.

A further embodiment of the present invention provides that the center rail is positively mounted in the carriages.

A further embodiment of the present invention provides that each of the carriages has a marginal flange projecting from the profile of the pull-out rail or of the supporting rail in the vertical direction, the rack being formed on such marginal flange.

A further embodiment of the invention provides that a stop is arranged at the rear end of the pull-out rail, thus securing the carriage mounted in the pull-out rail from falling out.

When the drawer is fully pulled out of the cupboard, the carriage mounted in the pull-out rail hangs in the rail and carries the center rail, the carriage running in the supporting rail on the furniture side wall being retained on the center rail and pulled out with the center rail.

A further embodiment of the present invention provides that the safeguard control is formed by a catch rotatably mounted on the center rail, such catch being a two-arm lever which spaces both carriages or one carriage and the supporting- or pull-out rail from one other, when the rails are fully pulled-out.

It is preferably provided that the catch engages a recess in a carriage.

A further embodiment provides that the slide rail props against the catch.

It is preferably provided that the recess is arranged in the carriage on the side of the supporting rail.

In order to control the movement of the carriages to an optimum extent throughout the entire operation of the pull-out guide assembly, a preferred embodiment provides that a pinion is arranged on the rotation axis of the catch, such pinion mating with the racks of the two carriages.

BRIEF DESCRIPTION OF THE DRAWINGS

In the following embodiments of the present invention will be described in greater detail with reference to the accompanying drawings without being limited thereto, and wherein.

FIG. 2 is a view similar to FIG. 1, but the drawer being shown pulled out of the body but still anchored thereto, FIG. 3 is a partial side view of the pull-out guide assembly, the drawer being shown fully pulled out of the body of the piece of furniture, FIG. 4 is a sectional view of a drawer with a pull-out guide assembly, the left side of the figure illustrating a covering plastic side wall, FIGS. 5a, 5b and 5c respectively are a transverse section, a longitudinal section, and a partial section along line Vc—Vc of FIG. 5b, showing a carriage comprising a slide which is disengaged, FIG. 6 is a view similar to FIG. 5b but showing the slide engaging the center rail.

DETAILED DESCRIPTION OF THE INVENTION

Figure 1:
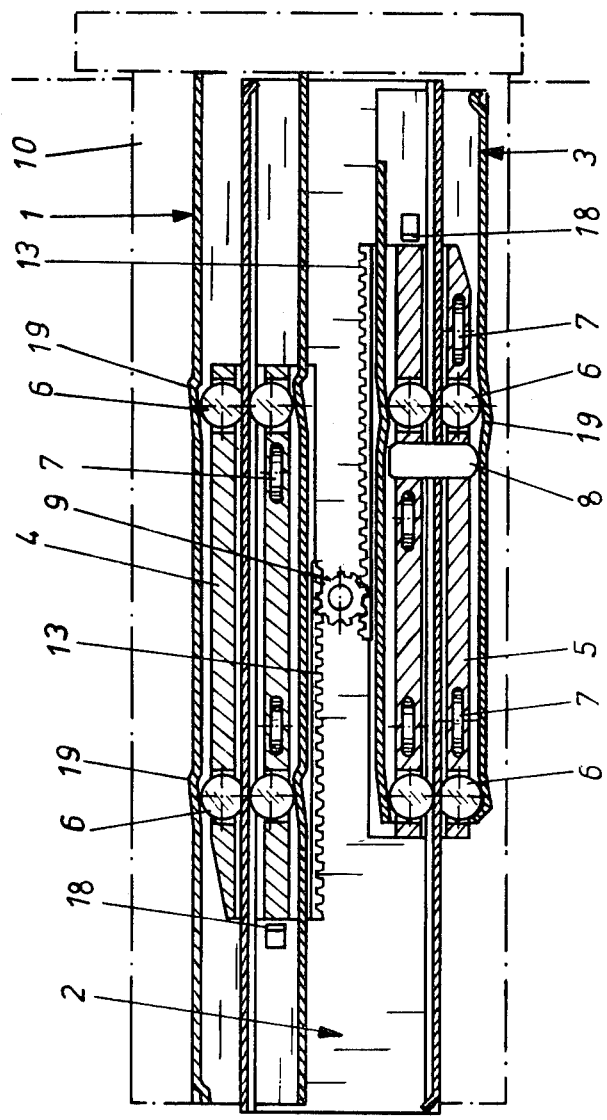
FIG. 1 is a sectional side view of a drawer with a pull-out assembly in accordance with the present invention, the drawer being shown pushed into the body of a piece of furniture.
Figure 7:
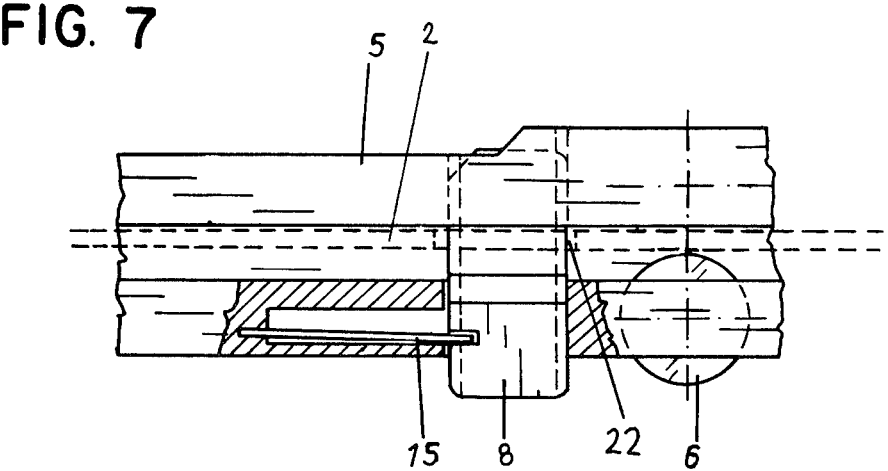
FIG. 7 is a section similar to FIG. 6, but of a carriage with a modification of the slide.
Figure 8:
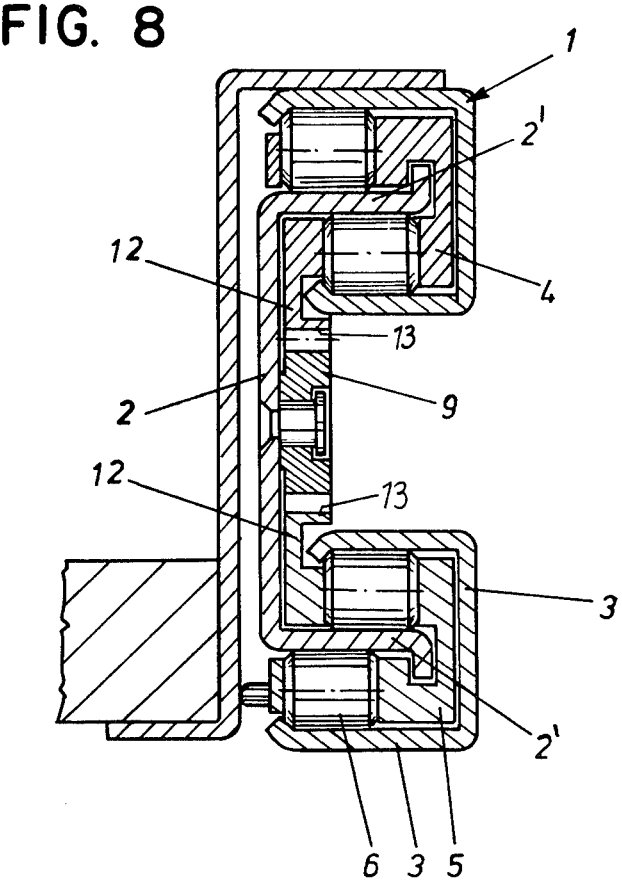
FIGS. 8 through 10 are transverse sectional views taken parallel to the front panel of the drawer of various embodiments of the pull-out guide assembly in accordance with the present invention.
Figure 9:
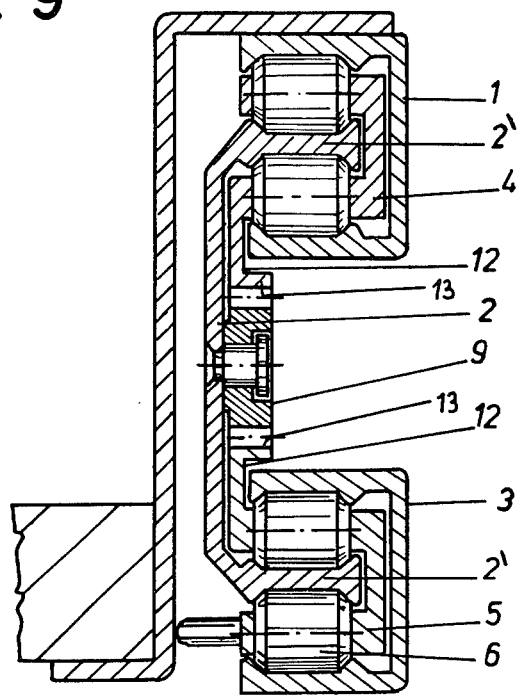

The figures of the drawings show only those members of the pull-out guide assembly which are laterally arranged on one side of the drawer or, possibly, on a shelf. It is obvious that the second part of the pull-out guide assembly, which is mounted on the other side of the drawer, is analogous to the first part.

The drawer and the side wall of the body of the piece have not been illustrated or have been indicated only schematically in the drawings as these members and the means for fastening the assembly in accordance with the present invention to a piece or article of furniture are not part of the present invention and are known to a person of ordinary skill in the art.

As can particularly be seen in FIGS. 1 and 2 and 11 through 15, the pull-out guide assembly in accordance with the present invention comprises a pull-out rail 1 fastened to the side wall of a drawer 10, a supporting rail 3 fastened to a side wall 11 of the body of a piece of furniture, two carriages 4,5, the carriage 4 being mounted in a pull-out rail 1 and the carriage 5 in the supporting rail 3, and a center rail 2 differentially running between the pull-out rail 1 and the supporting rail 3, two horizontal flanges 2' of center rail 2 being pushed into the carriages 4 and 5 and mounted between bearing supports such as roller 6 of ball members of the carriages 4,5.

The center rail 2 is thus mounted between the pull-out rail 1 and the supporting rail 3.

The carriages 4,5 are in some cases provided with horizontal compensating rollers 7 moving laterally on the vertical flanges of the rails, on the carriage 4 of the pull-out rail 1 and of the center rail 2, on the carriage 5 of the supporting rail 3 and of the center rail 2, thus guaranteeing an absolutely smooth running of the pull-out guide assembly.

The carriages 4,5 are provided (with the exception of the embodiment in accordance with FIG. 10) with marginal flanges 12 projecting over the profiles of the pull-out rail 1 or the supporting rail 3, each such marginal flange being provided with a rack 13.

A pinion 9 rotatably mounted in the center of the center rail 2 mates with the racks 13. The carriages 4,5 and the center rail 2 are thus safely connected to one another.

This means that, independently of the friction of the rollers 6 on the individual rails produced by the load of the drawer 10, the carriage 5 also moves automatically upon movement of the other carriage 4.

Figure 10:
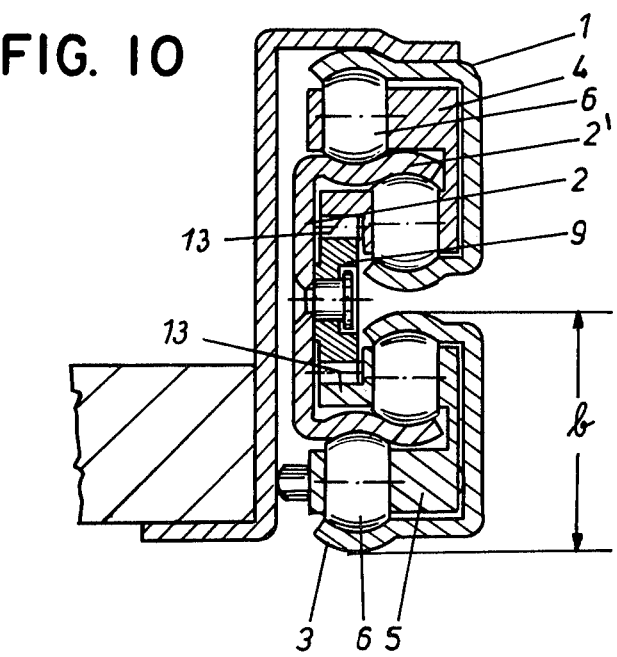
Figure 11:
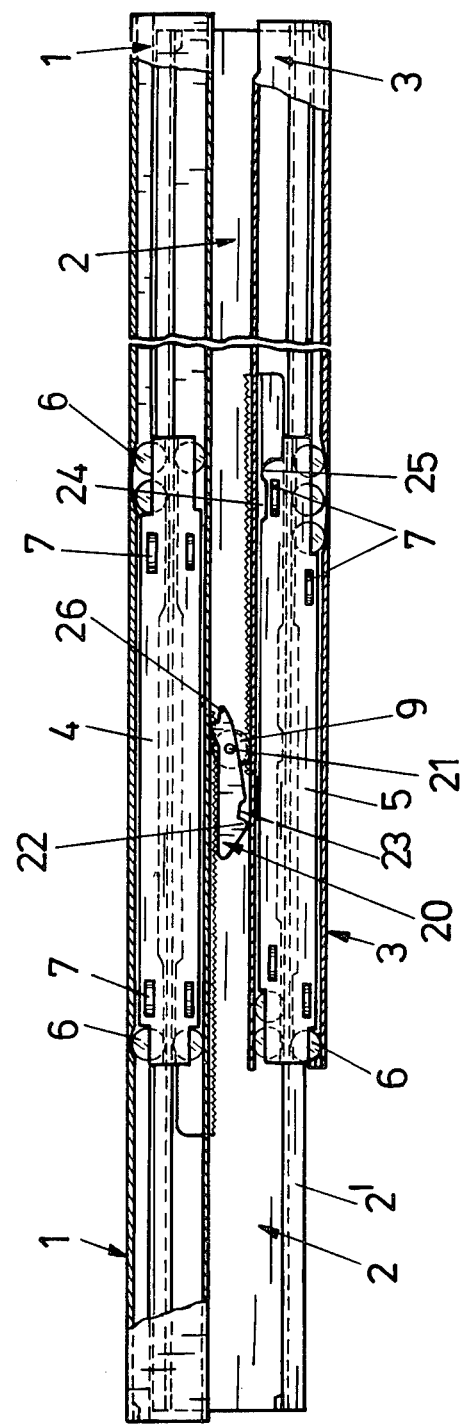
FIGS. 11 through 13 are schematic side views of a further embodiment of a pull-out guide assembly in accordance with the present invention, the drawer being in the pushed-in position and in the extreme pulled-out position.
Figure 12:
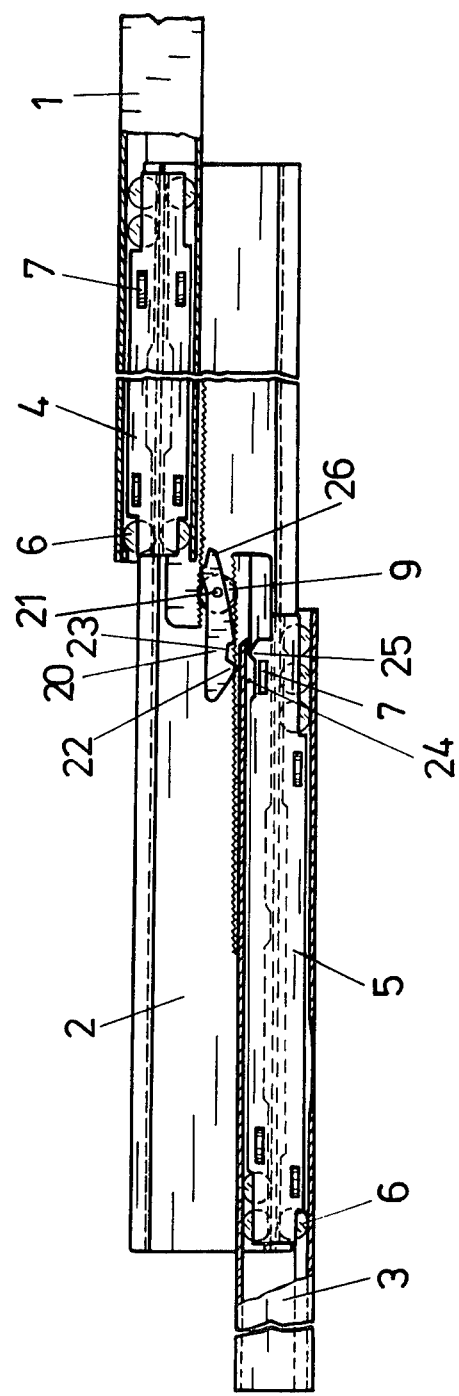
Figure 13:
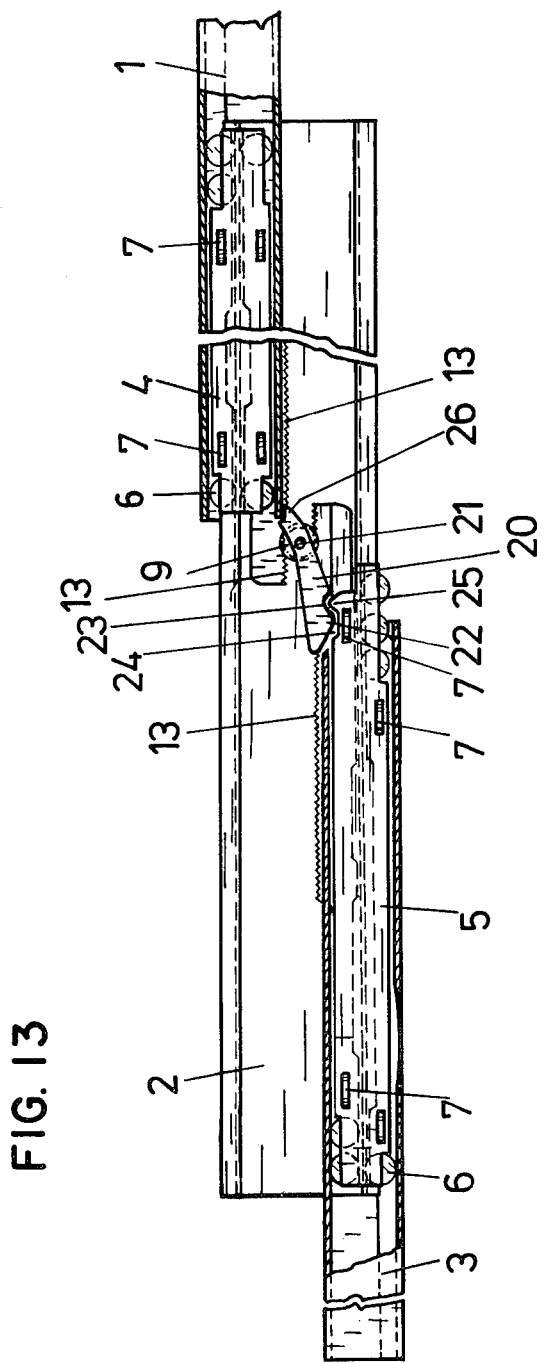
Figure 14:
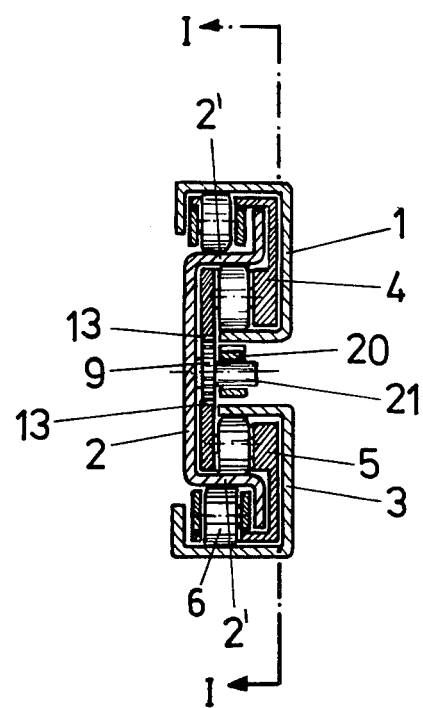
FIGS. 14 and 15 are cross-sectional views of a pull-out guide assembly in accordance with the present invention, FIG. 14 showing a carriage with rollers and FIG. 15 showing a carriage with balls.
Figure 15:
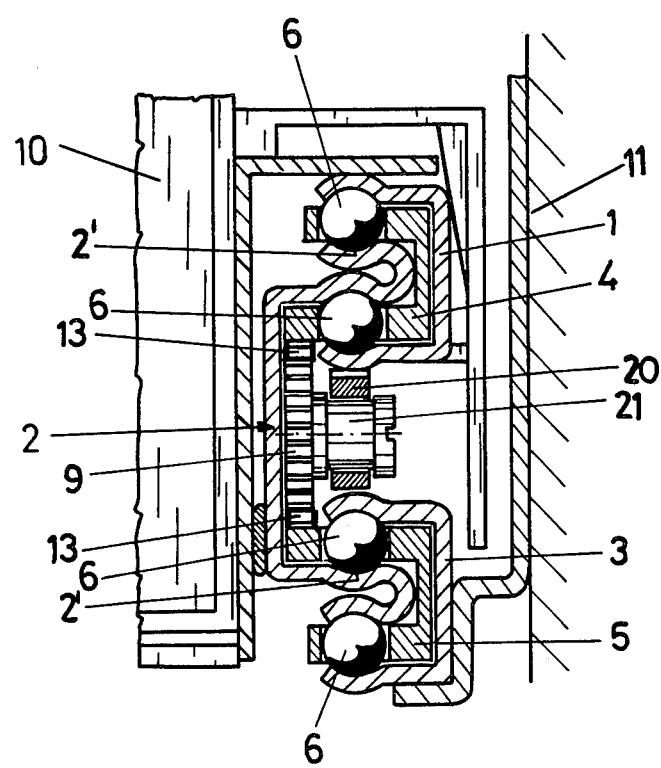
Figure 16:
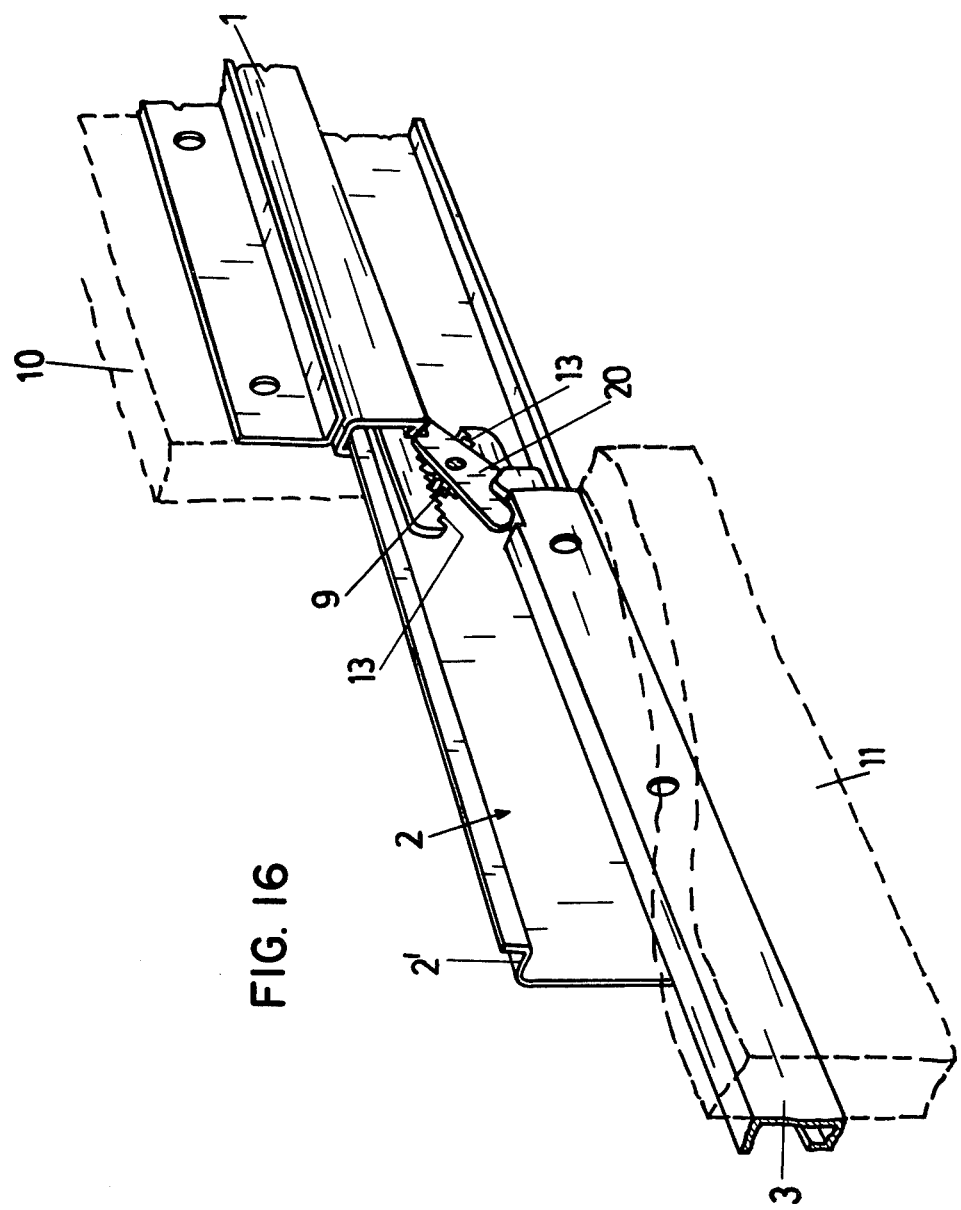
FIG. 16 is schematic view of a pull-out guide.

In the embodiment in accordance with FIG. 10, the rack 13 is arranged within the breadth b of the profile of the supporting rail 3 or the pull-out rail 1.

In the embodiment in accordance with FIGS. 1–4 and 7 through 10, the carriage 5 mounted in the supporting rail 3 is provided with a slide 8 acted upon by a leaf spring 15.

When the drawer 10, as illustrated in FIG. 3, is fully pulled out of the body of the piece of furniture and when the carriage 5 is in front of the supporting rail 3, the spring 15 presses the slide 8 through a hole or recess 22 in the lower horizontal flange 2' of the rail 2. The flange 2' and the recess 22 have been indicated in FIG. 7 for the sake of better understanding.

Thus, the carriage 5 is retained on the center rail 2, which is retained in the carriage 4. Carriage 4 is mounted in the pull-out rail 1, and is retained thereon by a stop 14 (FIG. 2).

Consequently, the drawer 10 can be fully pulled out of the body of the piece of furniture without making the individual members of the pull-out guide assembly fall apart.

In the embodiment in accordance with FIGS. 5 and 6, the slide 8 is not acted upon by a spring but is provided with two lateral crimps 16, a cam 17 injection moulded to the carriage 5 alternately engaging crimps 16. The slide 8 is by means of cam 17 retained either in an operating position or in a locking position. The slide 8 is moved by the horizontal flanges of the supporting rail 3 or by the position of the carriage 5.

When the drawer 10 is pushed into the body of the piece of furniture and, hence, the carriage 5 is pushed into the supporting rail 3, the slide 8 is unlocked by the lower horizontal flange of the supporting rail 3, and the pull-out guide assembly is fully serviceable.

Stops 18 are arranged on the center rail 2, such stops being adapted to correct the position of the carriages.

Recesses 19 in the pull-out rail 1 and the supporting rail 3 guarantee a secure support of the drawer 10 in the body of the piece of furniture due to the fact that the rollers 6 engage in such recesses when the drawer 10 is closed.

When the drawer 10 is pulled out, a slight resistance has to be overcome, and the drawer 10 has to be pulled such that rollers 6 move out of recesses 19 in order to allow a free forward movement. It is avoided thereby that the drawer 10 rolls out of the body of the piece of furniture unintentionally.

In the embodiment in accordance with FIGS. 11 through 15, a catch 20 is rotatably mounted on an axle 21 in the center of the center rail 2.

The catch 20 has a projection 22 and a recess 23 which respectively a recess 24 and a projection 25 on the carriage 5 running in the supporting rail 3, when the drawer is fully pulled out.

On the other end, the catch 20, which is a two-arm lever, is provided with another recess 26. Recess 26 receives the rear end of pull-out rail 1, i.e. the end of the pull-out rail 1 directed away from the drawer front panel, when the pull-out rail 1 is in the extreme pull-out position.

In this position, the lever arm of the catch 20, which is directed toward the carriage 5, is tilted downwards, and the other lever arm, i.e. the lever arm directed toward the pull-out rail 1, is tilted upwards.

By means of this arrangement, the carriages 4,5 and the pull-out rail 1 are spaced with respect to one another.

Instead of spacing the pull-out rail 1 from the carriage 5, the catch 20 also could space the carriage 4 from the carriage 5.

This embodiment in accordance with the present invention guarantees that the pull-out rail 1 and the carriage 4 are prevented from sliding inwards too early, when the drawer 10, which has entirely been taken out of the supporting rail 3, is inserted again.

First the catch 20 has to be unlocked from the carriage 5, and only then are the pull-out rail 1 and the carriage 4 released.

In this embodiment, the pinion 9 also is mounted on the pinion 9 mates with racks 13 of the carriage 4 and the carriage 5, whereby the movements of carriages 4,5 are controlled with respect to one another, as already provided in the afore-described embodiment.

What is claimed is:

1. A pull-out guide assembly for use on each of opposite sides of a drawer in an article of furniture of the type wherein the drawer is slidably insertable into and removable from a furniture body, said assembly comprising:
    a supporting rail adapted to be connected to a side wall of a furniture body;
    a first carriage mounted to run along said supporting rail, said first carriage having bearing supports;
    a pull-out rail adapted to be connected to a side of a drawer;
    a second carriage mounted to run along said pull-out rail, said second carriage having bearing supports;
    a center rail having vertically spaced horizontal flanges extending between and supported by said bearing supports of said first and second carriages, such that said carriages are movable along said center rail and said center rail is movable with respect to said pull-out and supporting rails; and
    means for controlling relative movement of said center rail with respect to said first and second carriages, said controlling means comprising first and second racks on said first and second carriages, respectively, and a pinion mounted on said center rail and engaging said first and second racks.

2. An assembly as claimed in claim 1, further comprising locking means for retaining one of said carriages on said center rail when said pull-out rail is moved with respect to said supporting rail to a drawer fully pulled-out position.

3. An assembly as claimed in claim 2, wherein said locking means is arranged on said first carriage and retains said first carriage on said center rail.

4. An assembly as claimed in claim 2, wherein said locking means comprises a slide movably mounted on said one carriage, said center rail has therein an opening, and spring means urging said slide toward said center rail, such that said slide engages into said opening when said pull-out rail is in said drawer fully pulled-out position.

5. An assembly as claimed in claim 1, wherein an inner end of said pull-out rail includes stop means for retaining said second carriage in said pull-out rail.

* * * * *